Oct. 18, 1955 V. M. GRANTHAM 2,721,040
TAKE-UP FILM REEL DRIVE
Filed Dec. 21, 1950
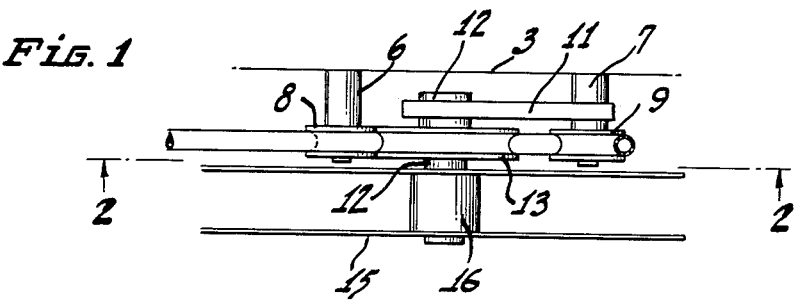
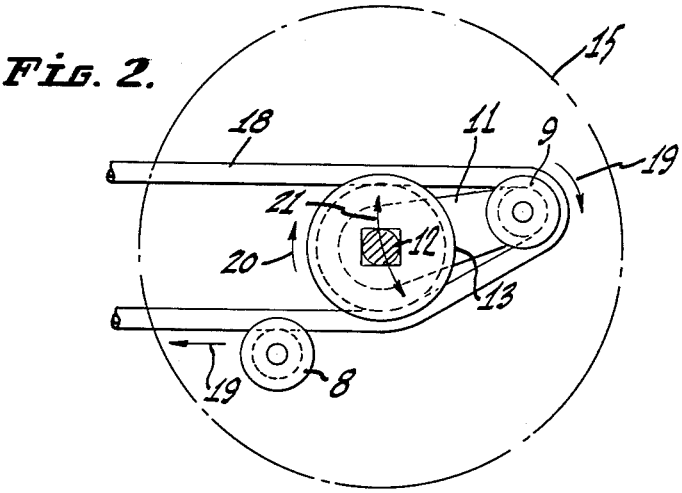
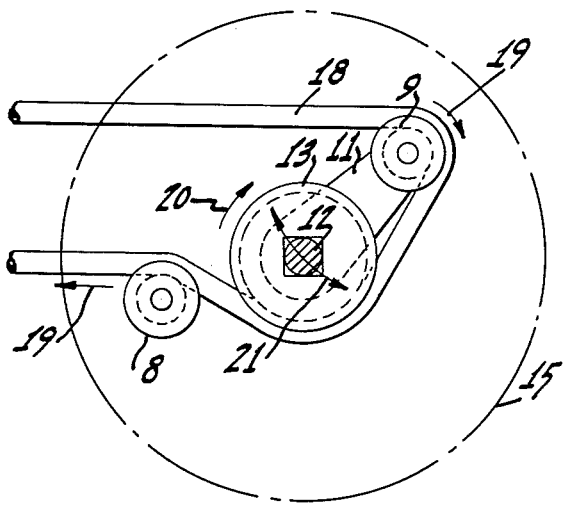
VIRGIL M. GRANTHAM,
INVENTOR.
BY
ATTORNEY.

United States Patent Office 2,721,040
Patented Oct. 18, 1955

2,721,040

TAKE-UP FILM REEL DRIVE

Virgil M. Grantham, Riverside, N. J., assignor to Radio Corporation of America, a corporation of Delaware Application December 21, 1950, Serial No. 202,086

2 Claims. (Cl. 242—55)

This invention relates to film apparatus, and particularly to a take-up film reel drive.

It is well-known that, in film equipment such as cameras, recorders, and projectors, film is advanced from a supply reel to a take-up reel at a uniform linear speed. It is also well-known that when the film is wound on a reel some form of a slipping or compensating clutch must be used in order to compensate for the varying diameter of the roll of film. Many forms of clutch arrangements have been suggested, one of which is disclosed and claimed in U. S. Patent No. 2,343,961 of March 14, 1944. This patented take-up reel mechanism includes an annular friction coupling means whereby the weight of the film roll increases the driving friction and torque applied to the reel. The present invention is one which also applies a greater torque to the reel spindle as the film roll increases in size, but is a simple economical mechanism for accomplishing this result. The invention utilizes a resilient belt which is caused to increase its wrap around the reel driving pulley as the weight of the film roll increases.

The principal object of the invention, therefore, is to facilitate the winding of film on a take-up reel.

Another object of the invention is to provide an improved film reel driving mechanism.

A further object of the invention is to provide a simplified and economical form of film take-up reel mechanism in which the driving torque for the reel increases with the size of the roll.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a plan view of a take-up reel driving mechanism embodying the invention.

Fig. 2 is an elevational view of the reel driving mechanism taken along the line 2—2 of Fig. 1 and showing the position of the driving elements for a substantially empty reel.

Fig. 3 is an elevational view, similar to Fig. 2, showing another position of the driving elements of the mechanism when the reel has a certain amount of film thereon.

Referring now to the drawings, in which the same numerals identify like elements, a frame 3 has mounted thereon two shaft studs 6 and 7 on the shaft ends of which are two belt pulleys 8 and 9. Pivoted on the stud 7 is one end of an arm 11, on the other end of which is a shaft 12 of a pulley 13. On the shaft 12, which also serves as a reel spindle, is a film reel 15 with its hub 16. Passing around the pulley 9 under the pulley 13 and over the pulley 8 is a resilient belt 18 of the spring type, the direction of travel of the belt being shown by the arrows 19, the direction of rotation of the pulley 13 being shown by the arrow 20. As the arm 11 is pivoted on the shaft element 7, the pulley 13 is movable along the path indicated by the double headed arrow 21.

The above described simple and economical mechanism drives the reel 15 to take up film thereon. When the film is started, the pulley 13 may have the position shown in Fig. 2, whereby very little of the belt 18 contacts the peripheral groove of the pulley, but it is sufficient to drive the reel 15. However, as the roll increases in size, a greater amount of torque is required, and this additional torque will be applied to the shaft 12 by the belt 18 as it contacts more of the pulley groove periphery, as shown in Fig. 3. Thus, although the belt may be driven at a constant linear speed, the necessary amount of torque will be applied to wind up the film as the roll becomes larger in diameter, and thus heavier, to move the pulley downwardly. Also, since the angular speed of the reel becomes less as the roll diameter increases, the necessary slippage may occur between the belt 18 and the pulley 13 or at the driving pulley, not shown, for the belt 18.

I claim:

1. A film take-up mechanism comprising a driving belt, a pair of spaced pulleys for guiding said belt in a predetermined path, the axes of said pulleys lying in a plane at an angle to the horizontal, a third pulley in contact with said belt at a point between the pulleys of said pair and within the loop of said belt formed by one of said pair of pulleys, and means for pivoting said third pulley on an axis coincident with the axis of said one pulley forming said loop, said third pulley having a diameter less than the distance between said pair of pulleys, said third pulley being movable between said pair of pulleys in an arc intersecting the plane of the axes of said pair of pulleys to form a loop between said pair of pulleys varying in size dependent upon the weight carried by said third pulley.

2. A film take-up mechanism in accordance with claim 1 in which said belt is resilient and a film take-up reel spindle is attached to said third pulley.

References Cited in the file of this patent

UNITED STATES PATENTS

| 365,051 | Crowell | June 21, 1887 |
|---|---|---|
| 1,277,559 | Emory | Sept. 3, 1918 |
| 1,810,690 | Trinks et al. | June 16, 1931 |
| 2,099,299 | Fritts | Nov. 16, 1937 |
| 2,124,938 | Wittel | July 26, 1938 |
| 2,174,411 | Baase et al. | Sept. 26, 1939 |
| 2,267,478 | Stechbart | Dec. 23, 1941 |
| 2,398,879 | Bouget | Apr. 23, 1946 |
| 2,464,135 | Hutchison, Jr. | Mar. 8, 1949 |
| 2,623,702 | Masterson | Dec. 30, 1952 |

FOREIGN PATENTS

| 23,048 | Great Britain | Oct. 17, 1896 |